United States Patent
Yao et al.

(10) Patent No.: US 8,169,745 B2
(45) Date of Patent: May 1, 2012

(54) HEAD GIMBAL ASSEMBLY HAVING BALANCED WEIGHT, AND DISK DRIVE UNIT WITH THE SAME

(75) Inventors: MingGao Yao, Dongguan (CN); YiRu Xie, Dongguan (CN)

(73) Assignee: Sae Magnetics (H.K.) Ltd., Hong Kong (CN)

( * ) Notice: Subject to any disclaimer, the term of this patent is extended or adjusted under 35 U.S.C. 154(b) by 1070 days.

(21) Appl. No.: 11/878,524

(22) Filed: Jul. 25, 2007

(65) Prior Publication Data
US 2009/0027807 A1 Jan. 29, 2009

(51) Int. Cl.
*G11B 5/48* (2006.01)

(52) U.S. Cl. .......................... 360/245; 360/245.3

(58) Field of Classification Search .............. 360/245, 360/245.3, 245.4
See application file for complete search history.

(56) References Cited

U.S. PATENT DOCUMENTS

| | | | | |
|---|---|---|---|---|
| 5,166,847 A * | 11/1992 | Zak | | 360/245.1 |
| 5,367,419 A * | 11/1994 | Kazama | | 360/245.7 |
| 5,452,158 A * | 9/1995 | Harrison et al. | | 360/245.3 |
| 5,774,305 A * | 6/1998 | Boutaghou | | 360/245.4 |
| 5,781,379 A * | 7/1998 | Erpelding et al. | | 360/245.3 |
| 5,923,500 A * | 7/1999 | Hagen | | 360/245.3 |
| 5,956,209 A * | 9/1999 | Shum | | 360/244.3 |
| 6,282,063 B1 * | 8/2001 | Coon | | 360/245.3 |
| 6,671,131 B2 | 12/2003 | Kasajima et al. | | |
| 6,700,749 B2 | 3/2004 | Shiraishi et al. | | |
| 6,885,523 B1 * | 4/2005 | Summers et al. | | 360/244.3 |
| 6,940,694 B2 * | 9/2005 | Ohwe et al. | | 360/234.6 |
| 6,995,953 B2 * | 2/2006 | Mahoney et al. | | 360/245.7 |
| 7,046,483 B2 * | 5/2006 | Erpelding | | 360/245.3 |
| 7,386,932 B2 * | 6/2008 | Girard | | 29/603.06 |
| 7,571,535 B2 * | 8/2009 | Wright | | 29/603.03 |
| 7,729,089 B1 * | 6/2010 | Hogan | | 360/234.6 |
| 7,826,177 B1 * | 11/2010 | Zhang et al. | | 360/245.3 |
| 7,859,793 B2 * | 12/2010 | Uematsu et al. | | 360/234.6 |
| 7,864,488 B1 * | 1/2011 | Pan | | 360/245.1 |
| 7,870,798 B2 * | 1/2011 | Yao et al. | | 73/865.9 |
| 2002/0051323 A1 * | 5/2002 | Rancour et al. | | 360/245.3 |
| 2003/0168935 A1 | 9/2003 | Ogawa et al. | | |
| 2008/0144224 A1 * | 6/2008 | Yao | | 360/245.4 |
| 2008/0192383 A1 * | 8/2008 | Takasugi et al. | | 360/244.2 |
| 2008/0239577 A1 * | 10/2008 | Zeng et al. | | 360/245.1 |

FOREIGN PATENT DOCUMENTS

JP 2002-133803 5/2002

* cited by examiner

*Primary Examiner* — Brian Miller
(74) *Attorney, Agent, or Firm* — Nixon & Vanderhye P.C.

(57) ABSTRACT

A HGA includes a load beam having a dimple formed thereon; a flexure including a suspension tongue and a support plate connected with the suspension tongue; and a slider having a leading edge and trailing edge opposite to the leading edge. The slider is mounted on the flexure such that the slider is supported by the dimple at the center of the slider. The leading edge is attached on the suspension tongue and trailing edge is attached on the support plate. A weight-balance structure is formed on the suspension tongue of the flexure to balance the weight of the HGA between a portion from the trailing edge to the slider center and another portion from the leading edge to the slider center. The invention also discloses various methods of manufacturing HGA with the balanced weight.

14 Claims, 15 Drawing Sheets

HEAD GIMBAL ASSEMBLY HAVING BALANCED WEIGHT, AND DISK DRIVE UNIT WITH THE SAME

FIELD OF THE INVENTION

The present invention relates to information recording disk drive devices and, more particularly, relates to a head gimbal assembly (HGA) having balanced weight at leading edge portion and trailing edge portion of its slider, a disk drive unit with the same and manufacturing method thereof.

BACKGROUND OF THE INVENTION

One known type of information storage device is a disk drive device that uses magnetic media to store data and a movable read/write head that is positioned over the media to selectively read from or write to the disk.

Consumers are constantly desiring greater storage capacity for such disk drive devices, as well as faster and more accurate reading and writing operations. Thus, disk drive manufacturers have continued to develop higher capacity disk drives by, for example, increasing the density of the information tracks on the disks by using a narrower track width and/or a narrower track pitch. However, each increase in track density requires that the disk drive device have a corresponding increase in the positional control of the read/write head in order to enable quick and accurate reading and writing operations using the higher density disks. As track density increases, it becomes more and more difficult using known technology to quickly and accurately position the read/write head over the desired information tracks on the storage media. Thus, disk drive manufacturers are constantly seeking ways to improve the positional control of the read/write head in order to take advantage of the continual increases in track density.

One approach that has been effectively used by disk drive manufacturers to improve the positional control of read/write heads for higher density disks is to employ a secondary actuator, known as a micro-actuator, which works in conjunction with a primary actuator to enable quick and accurate positional control for the read/write head. Disk drives that incorporate micro-actuators are known as dual-stage actuator systems.

Various dual-stage actuator systems have been developed in the past for the purpose of increasing the access speed and fine tuning the position of the read/write head over the desired tracks on high density storage media. Such dual-stage actuator systems typically include a primary voice-coil motor (VCM) actuator and a secondary micro-actuator, such as a PZT element micro-actuator. The VCM actuator is controlled by a servo control system that rotates the actuator arm that supports the read/write head to position the read/write head over the desired information track on the storage media. The PZT element micro-actuator is used in conjunction with the VCM actuator for the purpose of increasing the positioning access speed and fine tuning the exact position of the read/write head over the desired track. Thus, the VCM actuator makes larger adjustments to the position of the read/write head, while the PZT element micro-actuator makes smaller adjustments that fine tune the position of the read/write head relative to the storage media. In conjunction, the VCM actuator and the PZT element micro-actuator enable information to be efficiently and accurately written to and read from high density storage media.

One known type of micro-actuator incorporates PZT elements for causing fine positional adjustments of the read/write head. Such PZT micro-actuators include associated electronics that are operable to excite the PZT elements on the micro-actuator to selectively cause expansion or contraction thereof. The PZT micro-actuator is configured such that expansion or contraction of the PZT elements causes movement of the micro-actuator which, in turn, causes movement of the read/write head. This movement is used to make faster and finer adjustments to the position of the read/write head, as compared to a disk drive unit that uses only a VCM actuator. Exemplary PZT micro-actuators are disclosed in, for example, JP 2002-133803; U.S. Pat. Nos. 6,671,131 and 6,700,749; and U.S. Publication No. 2003/0168935, the contents of each of which are incorporated herein by reference.

FIGS. 1 and 2 illustrate a conventional disk drive unit and show a magnetic disk 101 mounted on a spindle motor 102 for spinning the disk 101. A voice coil motor arm 104 carries a head gimbal assembly (HGA) 100 that includes a micro-actuator 105 with a slider 103. The slider 103 has a read/write head (not shown) incorporated therein for reading or writing digital information to the disk 101. A voice-coil motor (VCM) is provided for controlling the motion of the motor arm 104 and, in turn, controlling the slider 103 to move from track to track across the surface of the disk 101, thereby enabling the read/write head of the slider 103 to read data from or write data to the disk 101.

Because of the inherent tolerances (e.g. dynamic play) of the VCM and the head suspension assembly, the slider cannot achieve quick and fine position control which adversely impacts the ability of the read/write head 103 to accurately read data from and write data to the disk when only a servo motor system is used. As a result, a PZT micro-actuator 105, as described above, is provided in order to improve the positional control of the slider and the read/write head 103. More particularly, the PZT micro-actuator 105 corrects the displacement of the slider on a much smaller scale, as compared to the VCM, in order to compensate for the resonance tolerance of the VCM and/or head suspension assembly. The micro-actuator 105 enables, for example, the use of a smaller recording track pitch, and can increase the "tracks-per-inch" (TPI) value for the disk drive unit, as well as provide an advantageous reduction in the head seeking and settling time. Thus, the PZT micro-actuator 105 enables the disk drive device to have a significant increase in the surface recording density of the information storage disks used therein.

FIGS. 3a-3c illustrate the HGA 100 incorporating a dual-stage actuator in the conventional disk drive device of FIGS. 1 and 2. The slider 103 is partially mounted on a slider support 121. A bump 127 is formed on the slider support 121 to support the center of the slider's back surface. A flex cable 122 with a plurality of traces couples the slider support 121 and a metal base flexure 123.

A suspension load beam 124 with a dimple 125 supports the slider support 121 and flexure 123. The dimple 125 of the suspension load beam 124 supports the bump 127 of the slider support 121. This ensures that the load force from the load beam 124 is applied to the slider center when the head is flying over the disk. A micro-actuator 10 comprising two thin-film PZT pieces is attached on a tongue region 128 and at least partially under the slider 103.

When a voltage is input to the thin-film PZT pieces, one of the two PZT pieces may contract (for example, contract along direction D shown in FIG. 3b), and the other one may expand (for example, expand along direction E shown in FIG. 3b). These contractions and/or expansions enable the slider 103 to rotate around the dimple 125 of the load beam 124 (e.g., rotate along direction C of FIG. 3b), thereby realizing fine displacement of the slider 103.

However, this conventional HGA design inherently possesses some disadvantages. More specifically, as shown in figures, the slider 103 has a trailing edge 134 on which the read/write head is formed and a leading edge 132 opposite to the trailing edge 132. It is clear from the figures that a portion approximately from the center of the slider 103 to the trailing edge 134 (referred to as trailing edge portion) is mainly supported by the slider support 121, while a portion from the center of the slider 103 to the leading edge 132 (referred to as leading edge portion) is approximately supported by nothing.

Since the slider support 121 is usually made of stainless steel and has a large thickness (for example about 18-25 um), a weight of the HGA 100 at trailing edge portion (totality of mass of the slider support 121 and half mass of the slider 103) is larger than weight at leading edge portion (only half mass of the slider 103). In other words, unbalance in weight of the HGA 100 occurs between the trailing edge portion and leading edge portion. Because the slider support 121 with the slider 103 mounted thereon is supported only by the dimple 125, and because weight-unbalance occurs between the leading edge portion and the trailing edge portion, the slider 103 and the slider support 121 will get to be tilt relative to the load beam 124 of the HGA 100. Unfortunately, this undesirable tilting will generate a reaction force which will be directly applied to the load beam 124 through the dimple 125. The frequently occurring reaction forces will induce frequent vibration of the load beam as to degrade resonance characteristics of the entire HGA, thereby further limit the servo bandwidth improvement and TPI improvement of the HGA.

Moreover, this undesirable tilting of the slider increases not only possibility of physical contact friction between the slider and the disk, but also possibility of contamination of the slider ABS when the slider is flying over or landing on the disk.

In addition, this slider tilting will result in big slider flying attitude sensitivity. Namely, the flying attitude of the slider will be easily changed when the slider is flying over the disk, thus adversely affecting head-disk interface (HDI) reliability of the entire disk drive unit.

Thus, it will be appreciated that there is a need in the art for an improved system that does not suffer from one or more of the above-mentioned drawbacks.

SUMMARY OF THE INVENTION

One object of the invention is to provide a HGA with balanced weight at leading edge and trailing edge and a disk drive unit, which can greatly improve resonance performance, servo bandwidth, as well as TPI value of the HGA.

Another object of the invention is to provide a HGA with balanced weight and a disk drive unit, which can reduce slider flying attitude sensitivity, physical contact friction and contamination between the slider and disk.

To attain the above objects, a HGA of the present invention comprises a load beam having a dimple formed thereon; a flexure comprising a suspension tongue and a support plate connected with the suspension tongue; and a slider having a leading edge and trailing edge opposite to the leading edge, the slider being mounted on the flexure such that the slider is supported by the dimple at the center of the slider. The leading edge is attached on the suspension tongue and trailing edge is attached on the support plate. A weight-balance structure is formed on the suspension tongue of the flexure to balance the weight of the HGA between a portion from the trailing edge to the slider center and another portion from the leading edge to the slider center.

The weight-balance block may be constructed of metal material such as copper or other material e.g. polymer so as to increase weight of the suspension tongue. In addition, the weight-balance block may be formed on the suspension tongue by welding. Alternatively, the weight-balance block may also be integrally formed with the suspension tongue by etching away part of the suspension tongue material. The suspension tongue and the support plate are connected with each other by a neck beam. A pair of outer triggers is longitudinally formed on the flexure, and the suspension tongue and the support plate are suspended between the pair of the outer triggers via the neck beam.

In accordance with another embodiment, a HGA comprises a load beam having a dimple formed thereon; a flexure comprising a suspension tongue and a support plate connected with the suspension tongue; and a slider having a leading edge and trailing edge opposite to the leading edge. The slider is mounted on the flexure such that the slider is supported by the dimple. The leading edge is attached on the suspension tongue and trailing edge is attached on the support plate. The distance from the dimple to the trailing edge is shorter than that from the dimple to the leading edge.

In accordance to another embodiment, a HGA is provided. It comprises a load beam having a dimple formed thereon; a flexure comprising a suspension tongue and a support plate connected with the suspension tongue; and a slider having a leading edge and trailing edge opposite to the leading edge, the slider being mounted on the flexure such that the slider is supported by the dimple at the center of the slider. The leading edge is attached on the suspension tongue and trailing edge is attached on the support plate. A weight-balance structure is formed on the support plate to balance the weight of the HGA between a portion from the trailing edge to the slider center and another portion from the leading edge to the slider center. Namely, at least recess and/or hole may be defined in the support plate by means of etching for reducing the weight thereof, thus bringing a weight balance between the two portions.

A head gimbal assembly comprises a load beam having a dimple formed thereon; a flexure comprising a suspension tongue and a support plate connected with the suspension tongue; and a slider having a leading edge and trailing edge opposite to the leading edge. The slider is mounted on the flexure such that the slider is supported by the dimple, the leading edge being attached on the suspension tongue and trailing edge being attached on the support plate. The dimple is offset from the slider center towards the trailing edge a distance to balance the weight of the HGA between a portion from the trailing edge to the slider center and another portion from the leading edge to the slider center.

A disk drive unit comprises a HGA; a drive arm connected to the HGA; a disk; and a spindle motor operable to spin the disk. The HGA may be any one described above.

Compared with conventional HGA, since the HGA of the invention is well balanced in weight at leading edge portion and trailing edge portion by adding mass of the suspension tongue or shifting dimple location from center of the slider to a new location nearer the trailing edge or reducing mass of the support plate, the suspension tongue, the support plate and the slider will rotate against the dimple at a horizontal plane parallel to the load beam, thus no tilting with respect to the load beam will occur. Accordingly, no reaction force will be generated to the load beam such that no vibration will happen to the suspension. Namely, possibility of suspension resonance will be reduced, therefore, improving resonance performance, servo bandwidth, and TPI value as well. Furthermore, slider flying attitude sensitivity, physical contact friction and contamination between the slider and disk will also be reduced.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings:

FIG. 3c partially shows a perspective view of the HGA of FIG. 3a;

FIG. 4b shows a partial perspective view of the HGA of FIG. 4a;

FIG. 4c partially shows a top plan view of the HGA of FIG. 4a;

FIG. 4d shows a perspective view of a thin-film PZT micro-actuator of the HGA of FIG. 4a;

FIG. 4f partially shows a side view of the HGA of FIG. 4a;

FIG. 6b partially shows a cross-sectional view of a suspension tongue of FIG. 6a;

FIG. 8b partially shows a cross-sectional view of the HGA of FIG. 8a;

DETAILED DESCRIPTION OF ILLUSTRATED EMBODIMENTS

Figure 1:
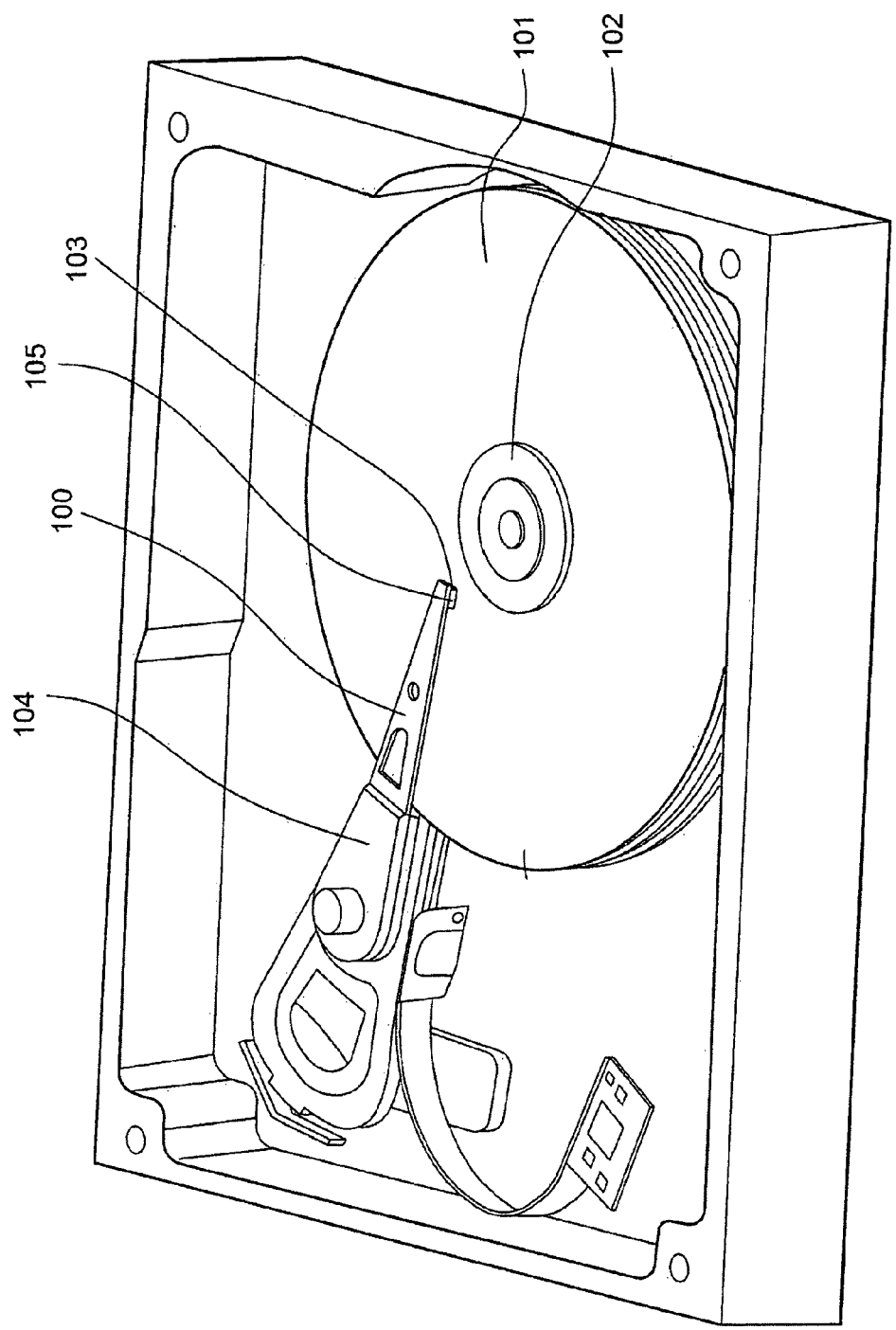
FIG. 1 is a perspective view of a conventional disk drive unit.
Figure 2:
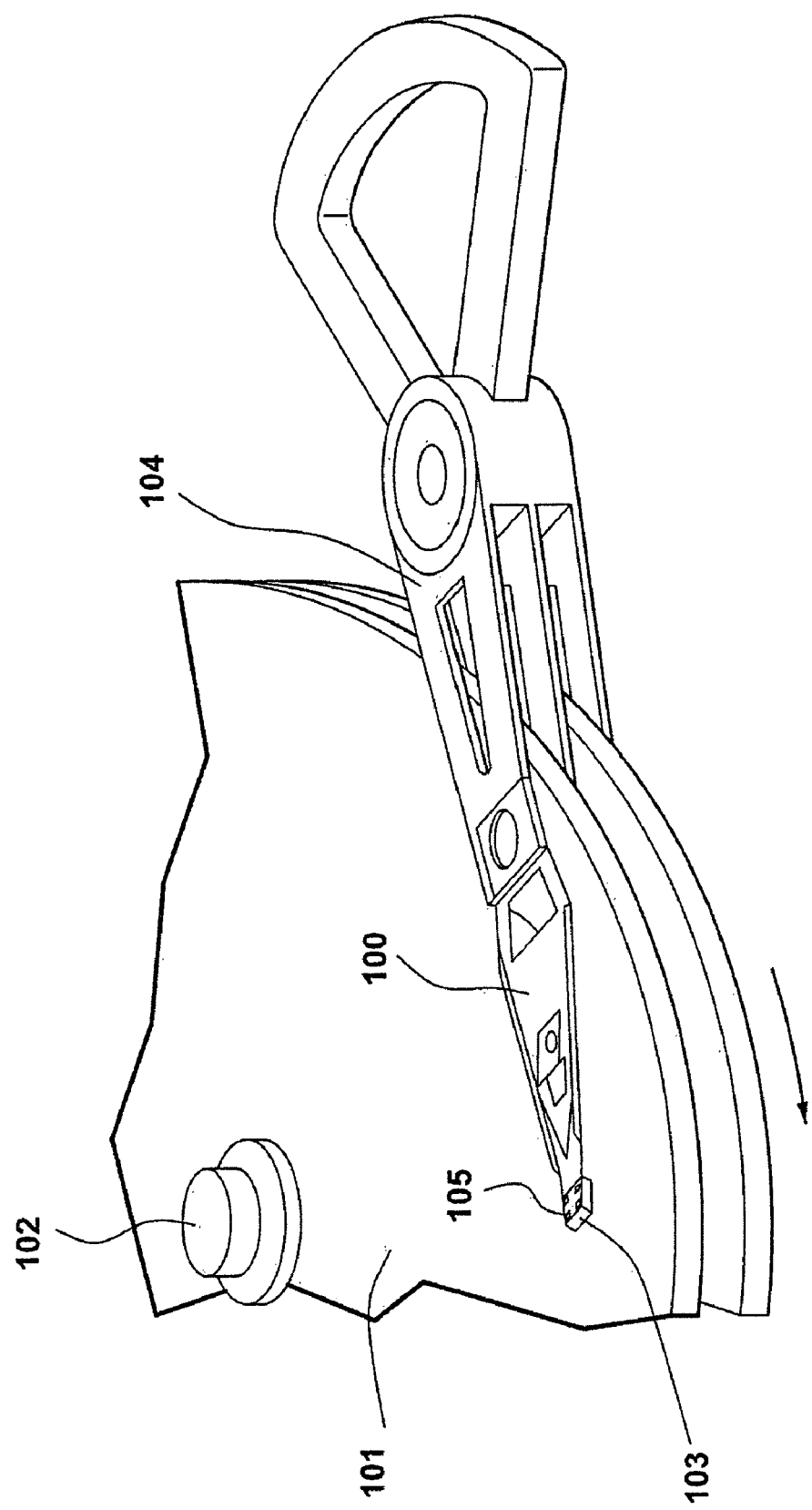
FIG. 2 is a partial perspective view of the conventional disk drive unit shown in FIG. 1.
Figure 3A:
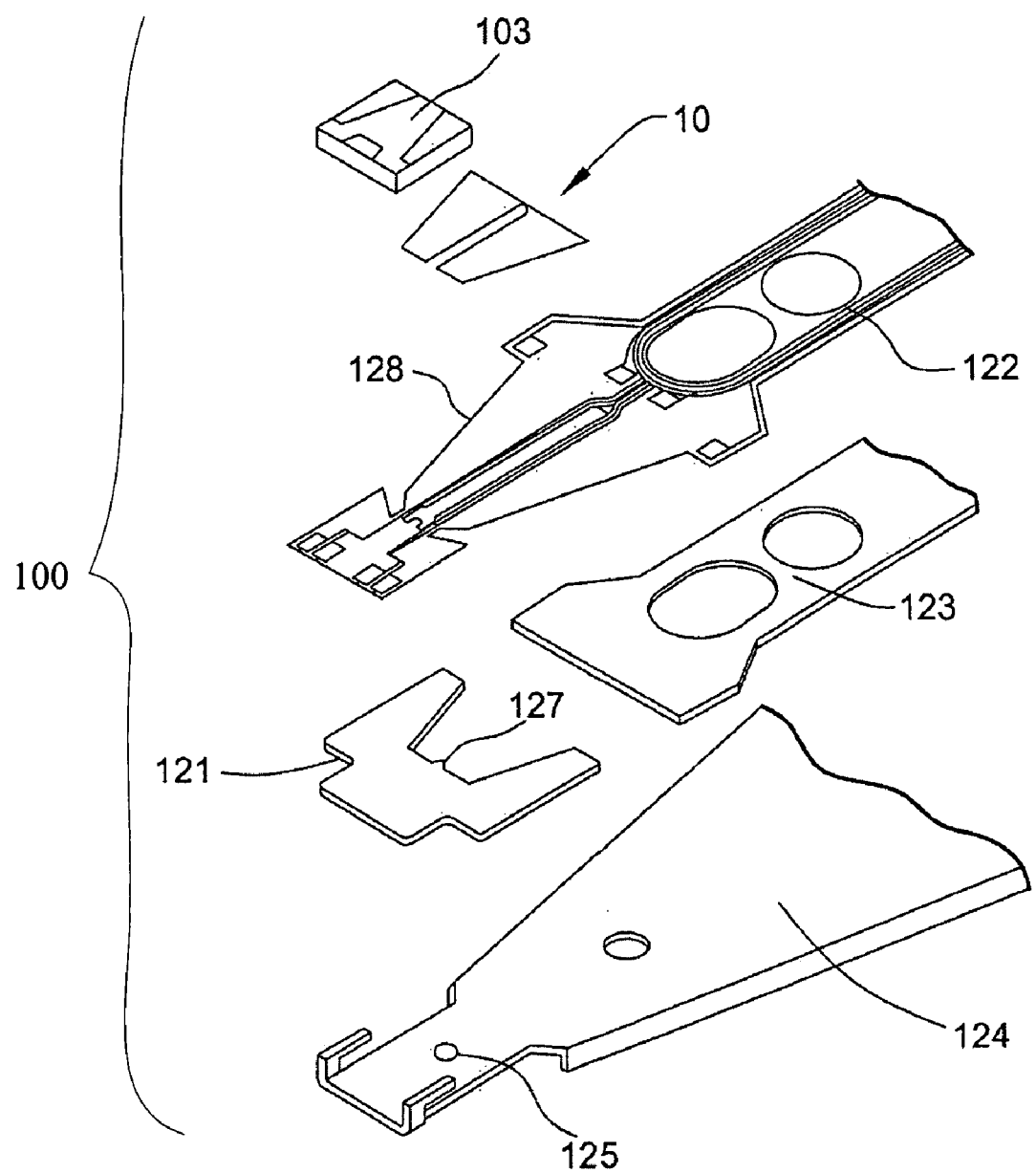
FIG. 3a is an exploded perspective view of a HGA of FIGS. 1-2.
Figure 3B:
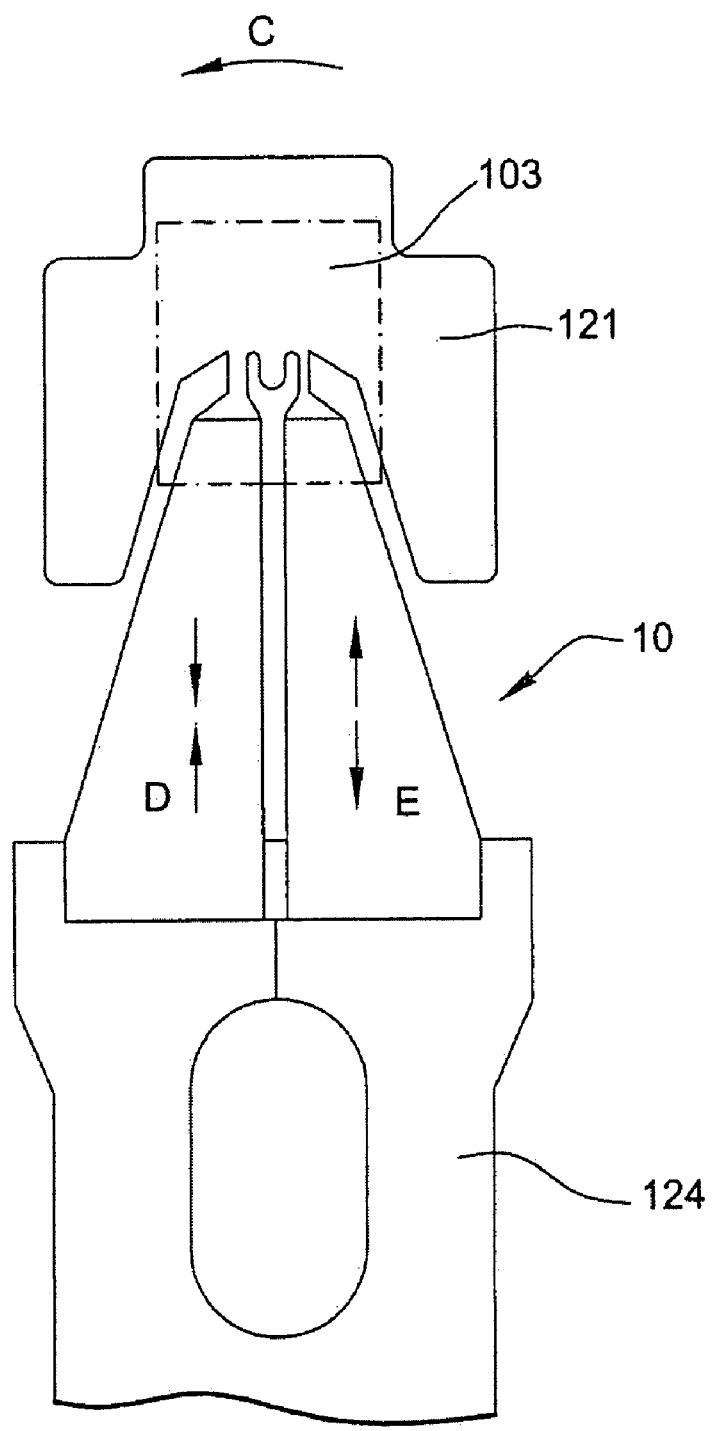
FIG. 3b partially shows a top plan view of the HGA shown in FIG. 3a in an assembled state.
Figure 3C:
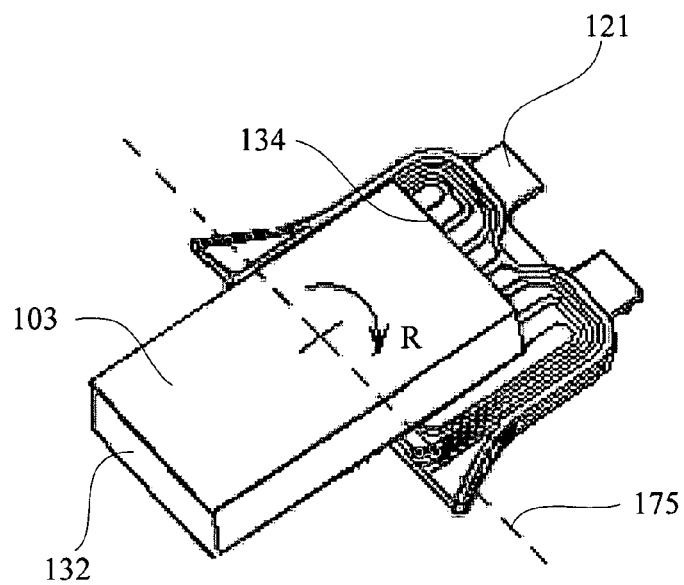

Various embodiments of the invention will now be described. As will be illustrated, the invention provides a HGA having balanced weight between leading edge portion and trailing edge portion of its slider. By adjusting mass of suspension tongue (or mass of support plate) and/or by shifting location of dimple, the weight at leading edge portion and trailing edge portion is sufficiently balanced. Therefore, resonance performance, servo bandwidth, as well as TPI value of the HGA will be improved. In addition, less flying attitude sensitivity, physical contact friction and contamination between the slider and the disk will be experienced by the HGA.

FIGS. 4a-5b denotes a HGA with weight-balanced slider according to a first embodiment of the invention. As shown in figures, the HGA 200 comprises a slider 203, a thin-film PZT micro-actuator 217 (as shown in FIG. 4d and FIG. 4e) to fine adjust displacement of the slider 203, and a suspension 290 to support both the slider 203 and the thin-film PZT micro-actuator 217.

The suspension 290 comprises a base plate 202, a load beam 205, a hinge 201 to connect the base plate 202 and the load beam 205 together, and a flexure 204 mounted on both the hinge 201 and the load beam 205. The base plate 202 is constructed of suitable stiff material e.g. stainless steel for improving stiffness of the entire suspension 290. A mounting aperture (not labeled) is defined in the base plate 202 for connect the HGA 200 to a drive arm of a disk drive unit. In addition, a structural hole (not labeled) is also defined in the base plate 202 to reduce total weight of the HGA 200. The load beam 205 may be made of stainless steel and be indirectly connects with the base plate 202 via the hinge 201. The load beam 205 partially supports the flexure 204 thereon.

The flexure 204 is made of flexible material and extends across the hinge 201 and the load beam 205. A suspension tongue 213 and a support plate 214, both of which are used for supporting the slider 203 thereon, are formed on a distal end of the flexure 204. A neck beam 222 connects the suspension tongue 213 and the support plate 214 together. The neck beam 222 also connects at its two lateral sides with a pair of outer triggers 211 such that the support plate 214 and the suspension tongue 213 are suspended between the pair of outer triggers 211. The pair of outer triggers 211 is longitudinally formed on the flexure 204. A pair of PZT mounting regions 216 is defined on the flexure 204 at locations between the two outer triggers 211 and adjacent the suspension tongue 213.

Figure 4A:
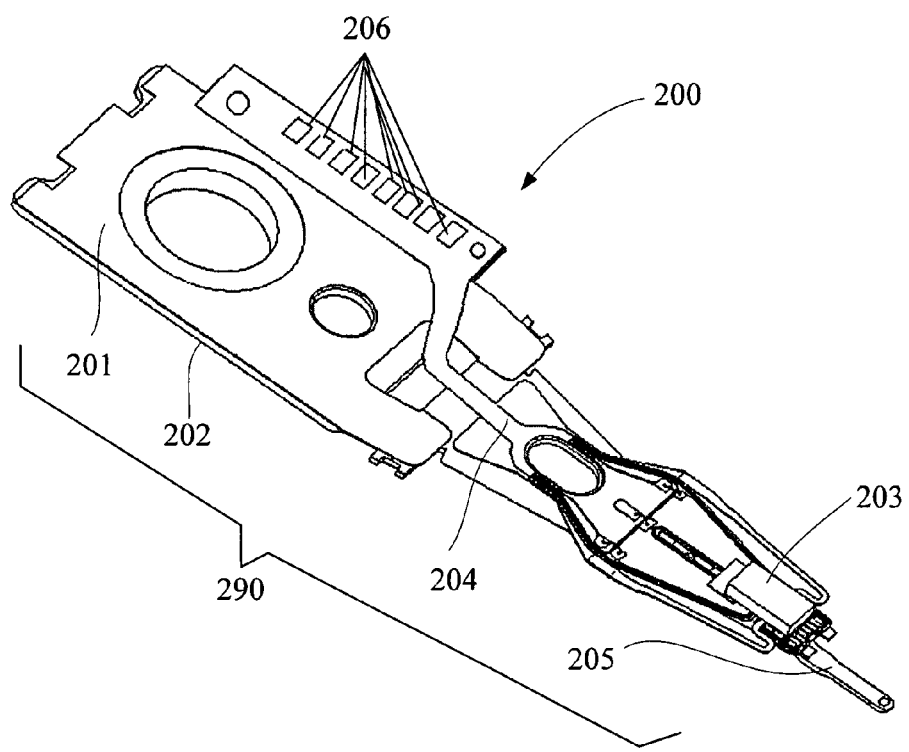
FIG. 4a shows a perspective view of a HGA according to an embodiment of the invention.
Figure 4B:
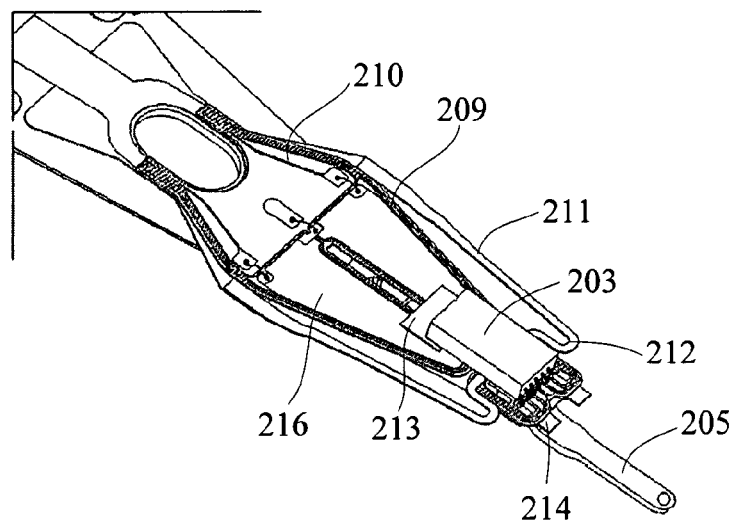
Figure 4C:
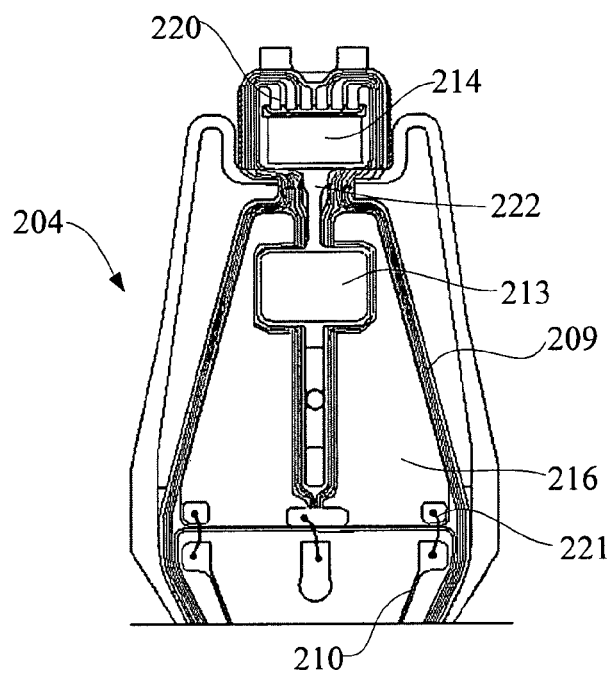
Figure 4D:
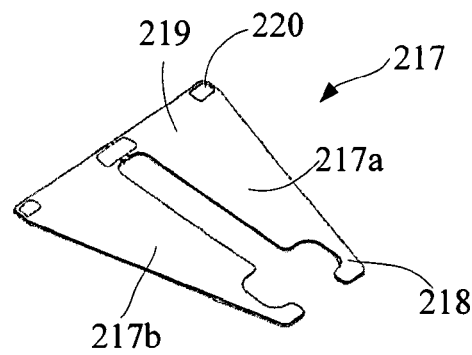

Referring to FIG. 4d, the thin-film PZT micro-actuator 217 comprises a pair of PZT pieces 217a and 217b. Each PZT piece has a base end 219 and a free end 218. The base ends 219 of the two PZT piece are connected with each other. Several electrical pads 219, for example three electrical pads are formed on the base ends 219 thereof. The same number of electrical pads 221 is correspondingly formed on the PZT mounting regions 216 of the flexure 204. After the pair of PZT pieces 217a/217b is mounted on the PZT mounting regions 216, these electrical pads 219 and 221 will be electrically connected to each other. The electrical pads 221, in turn, are electrically coupled with a plurality of electrical pads 206 provided on a proximal end of the flexure 204 via a group of inner traces 210 extending along length direction of the flexure 204. By these electrical connections, the PZT pieces 217a/217b can be controlled by an external control system connected to the electrical pads 206 such that the PZT pieces 217a/217b can perform contractions and/or expansions.

The slider 203 includes a trailing edge 234 having a read/write head formed thereon and a leading edge 232 opposite to the trailing edge 234. The slider 203 is partially mounted on the support plate 214 and the suspension tongue 213 of the flexure 204. A plurality of electrical pads 220 is formed on the support plate 214, and the read/write head of the slider 203 is electrically connected with the pads 220 via a plurality of solder balls 225. A group of outer traces 209 extending along the length of the flexure 204 connects the pads 220 and the pads 206 formed on the proximal end of the flexure 204. By these electrical connections, the slider 203 is also controlled by the external control system.

A dimple 224, which is formed on the load beam 205 (refer to FIG. 4f) supports the center of the slider 203 at its back side to make sure that loading forces coming from the load beam 205 can be precisely applied at the center of the slider 203, thus maintaining good flying stability for the slider 203. Trailing edge portion (portion from the slider center to the trailing edge 234) of the slider 203 is mainly located on the support plate 214 of the flexure 204, while leading edge portion (portion from the slider center to the leading edge 232) thereof is mainly located on the suspension tongue 213 of the flexure 204.

If no balance weight were maintained for the HGA 200 of the invention, weight of the HGA at trailing edge portion would be approximately totality of mass of the support plate 214, half mass of the slider 203 and mass of the solder balls 225, while weight at the leading edge portion would be totality of mass of the suspension tongue and half mass of the slider 203. Obviously, weight at the trailing edge portion would be greater than that at the leading edge portion, and consequently, unbalance in weight of the HGA 200 would occur, thus resulting in bad consequences as suffered by conventional HGA. For overcoming this unbalance in weight, mass of the suspension tongue 213 is increased, for example by introducing additional mass-adding material into conventional suspension tongue material. This will be discussed below.

Figure 4E:
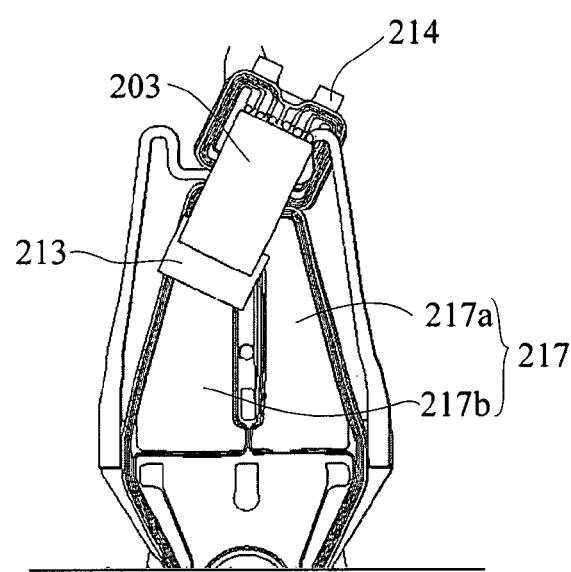
FIG. 4e illustrates operation of the micro-actuator shown in FIG. 4d.
Figure 4F:
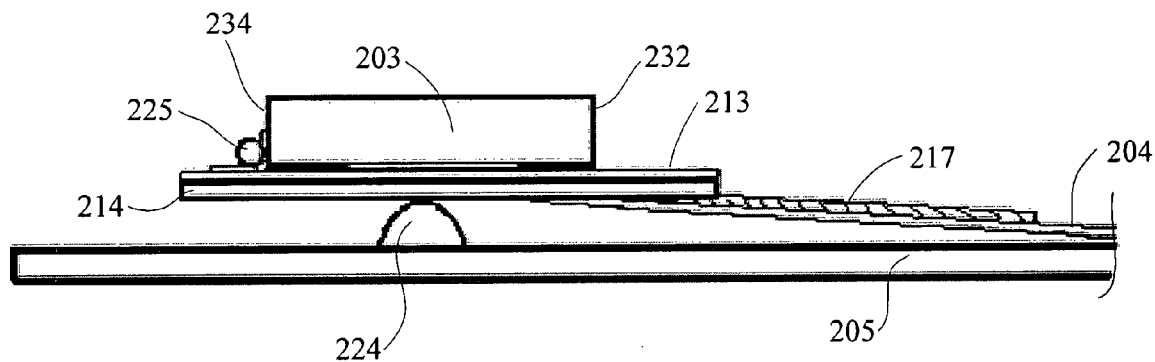
Figure 4G:
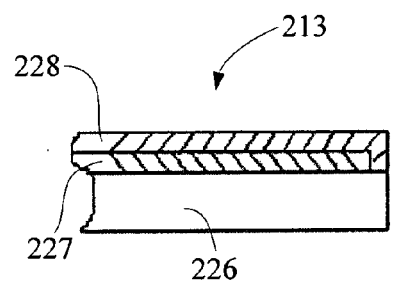
FIG. 4g partially shows a cross-sectional view of a suspension tongue of the HGA of FIG. 4f.

As shown in FIG. 4g, the suspension tongue 213 comprises a base layer 226, a first mass-adding layer 227 laminated on the base layer 226 and a second mass-adding layer 228 laminated on the first mass-adding layer 227. The base layer 226 may be constructed by suitable stiff material such as stainless steel so as to strongly support the slider 203. The first and second mass-adding layers 227, 228 serve to increase the total mass of the suspension tongue 213.

These mass-adding layers 227 and 228 may be made of any material which have a high mass density and which are also easy for manufacture. For example, the first mass-adding layer 227 can be made of polymer material which is easy for lamination of a second material for example the second mass-adding layer 228 and, the second mass-adding layer 228 can be made of a metal material such as copper, Nickel or gold. In this situation, the metal material such as copper material can also function as a conductive layer of the suspension tongue 213. In another embodiment of this invention, the first mass-adding layer 227 can be made of metal material such as copper, Nickel or gold, while the second mass-adding layer 228 can be made of polymer material which can function as a polymer cover layer of the suspension tongue 213. Furthermore, Although two mass-adding layers of material are laminated on the original suspension tongue (i.e., the base layer 226), it is also possible to laminate only one or more than two layers of mass-adding material so as to adjust weight at the suspension tongue 213 (i.e., leading edge portion) of the HGA 200.

These mass-adding layers 227 and 228 add the total mass of the suspension tongue 213 such that the weight of the HGA 200 at the trailing edge portion is equal to that at the leading edge portion. This balance in weight will bring good results. For example, as shown in FIGS. 4e and 4f, when the PZT pieces 217a and 217b of the micro-actuator 217 are excited, the suspension tongue 213, the support plate 214 and the slider 203 will all rotate against the dimple 224 at a horizontal plane parallel to the load beam 205, thus no tilting with respect to the load beam 205 will occur. Accordingly, no reaction force will be generated to the load beam 205 such that no vibration will happen to the suspension. In other words, possibility of suspension resonance will be reduced, therefore, improving resonance performance, servo bandwidth, and TPI value as well. In addition, less flying attitude sensitivity, physical contact friction and contamination will be experienced by the HGA. These advantages can be demonstrated by experiment curves shown in FIGS. 5a-5b.

Figure 5A:
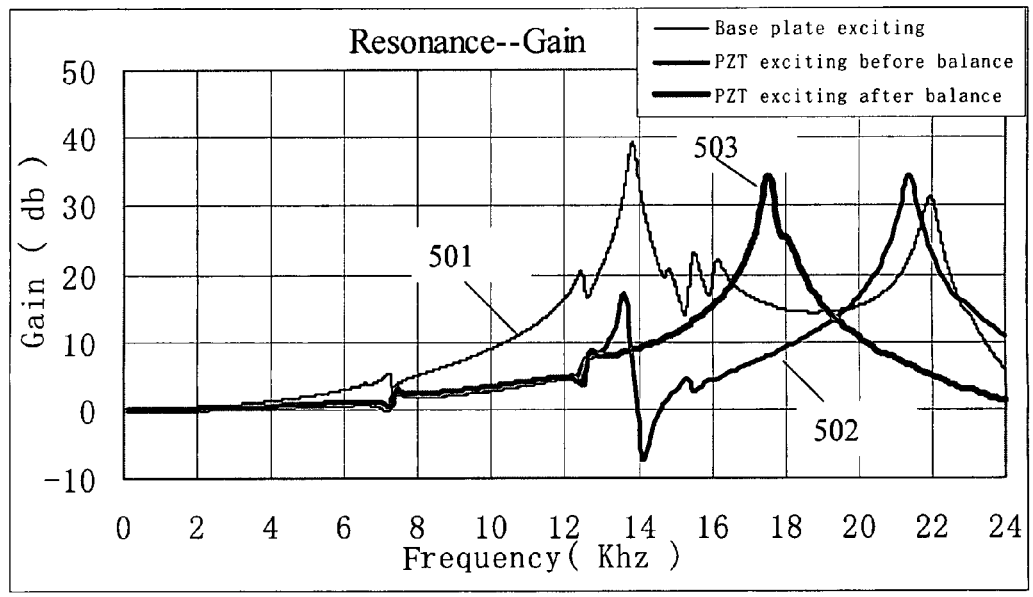
FIG. 5a shows a series of resonance-gain curves to illustrate resonance characteristic of the invention.

Referring to FIG. 5a, curve 501 represents vibration-gain characteristics of the base plate exciting, curve 502 represents vibration-gain characteristics of the PZT exciting before weight of the HGA is balanced, while curve 503 represents vibration-gain characteristic of the PZT exciting after weight of the HGA is balanced. As clearly seen from the figure, at frequency about 14 KHz, both the curves 501 and 502 have a peak gain value, meaning that resonance between base plate exciting and PZT exciting happens at this point. Comparatively, curve 503 has no peak gain value at frequency of 14 KHz, showing that no resonance between base plate exciting and PZT exciting occurs at 14 KHz after the HGA is weight-balanced.

Figure 5B:
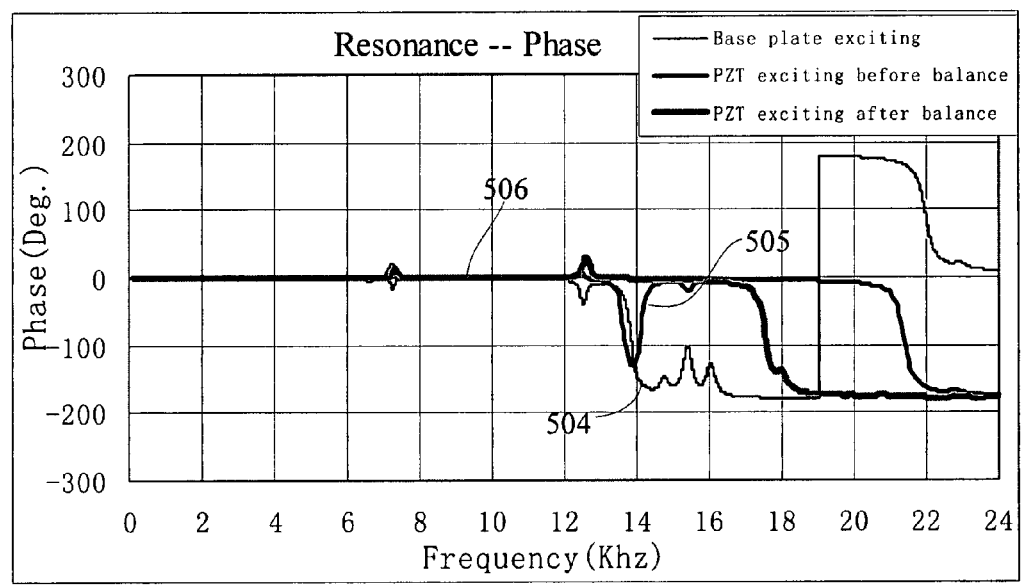
FIG. 5b shows a set of resonance-phase curves to illustrates resonance characteristic of the invention.

Similarly, as shown in FIG. 5b, curve 504 represents vibration-phase characteristics of the base plate exciting, curve 505 represents that of the PZT exciting before the HGA is weight-balanced, while curve 506 represents that of the PZT exciting after the HGA is weight-balanced. At frequency of 14 KHz, curves 504 and 505 both have a maximum phase value in the same direction, meaning that resonance between base plate exciting and PZT exciting happens at this frequency point. By contrast, curve 506 has a phase value approximate zero at the same frequency point, meaning that no resonance between the base plate-exciting and PZT exciting happens after the HGA is weight-balanced.

In summary, since the HGA is balanced in weight at its leading edge portion and trailing edge portion, no HGA resonance happens at low frequency (for example at 14 KHz). In other words, even if any resonance happens, it will happen at a higher frequency. This means resonance performance, as well as servo bandwidth of the HGA of the invention, are greatly improved compared with convention weight-unbalanced HGA.

Figure 6A:
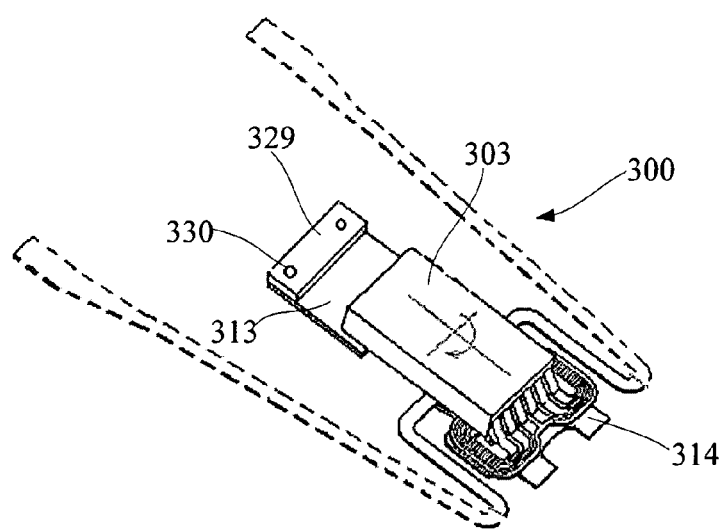
FIG. 6a partially shows a perspective view of a HGA according to another embodiment of the invention.
Figure 6B:
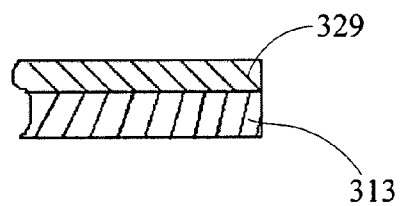

FIGS. 6a-6b illustrate another type of HAG according to another embodiment. The HGA 300 is similar to the HGA 200 described above and mere difference lies in a weight-balance block 329 is provided on the suspension tongue 313 to keep weight balance for the HGA 300 at leading edge portion (portion from the slider center to the leading edge) and trailing edge portion (portion from the slider center to the trailing edge). The weight-balance block 329 may be made of any suitable material with a high mass density e.g. metal material such as stainless steel or copper. Furthermore, the block 329 may be mounted on the suspension tongue 313 by any suitable method. For example, it can be mounted thereon by welding at welding points 330. Alternatively, the block 329 may be integrally formed with the suspension tongue 313 for example by etching away part of the suspension tongue material.

The slider 303 is attached on both the suspension tongue 313 and the support plate 314. By providing such a weight-balance block 329, weight of the HGA 300 at leading edge portion and trailing edge portion is well balanced, thereby being capable of getting similar advantages as the HGA 200.

Figure 7:
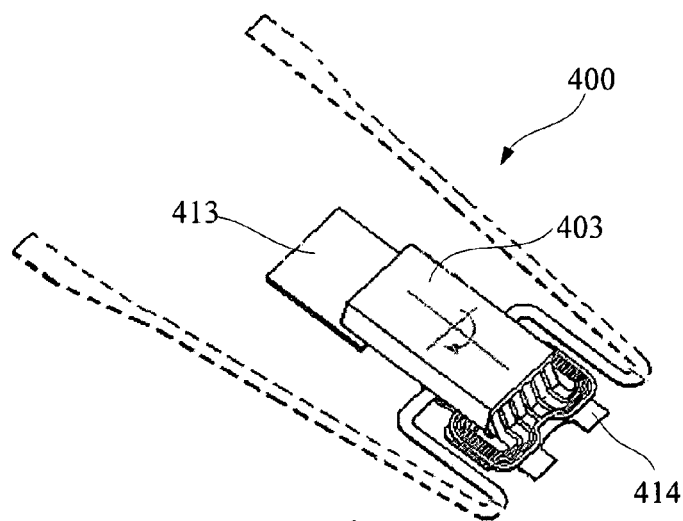
FIG. 7 partially shows a perspective view of a HGA according to another embodiment of the invention.

FIG. 7 shows a HGA 400 according to another embodiment of the invention. The HGA 400 is similar to the HGA 200, but in this embodiment, the HGA 400 is properly lengthened in order to increase mass of the suspension tongue 413. Similarly, the slider 403 is attached between the suspension tongue 413 and support plate 414. By increasing mass, weight of the HGA 400 at leading edge portion (portion from the slider center to the leading edge) and trailing edge portion (portion from the slider center to the trailing edge) is also balanced, thus attaining similar advantages as the HGA 200. It should be noted though in the embodiment, only length of the HGA 400 is increased, the width and/or thickness thereof may also be increased so as to get similar effects.

Figure 8A:
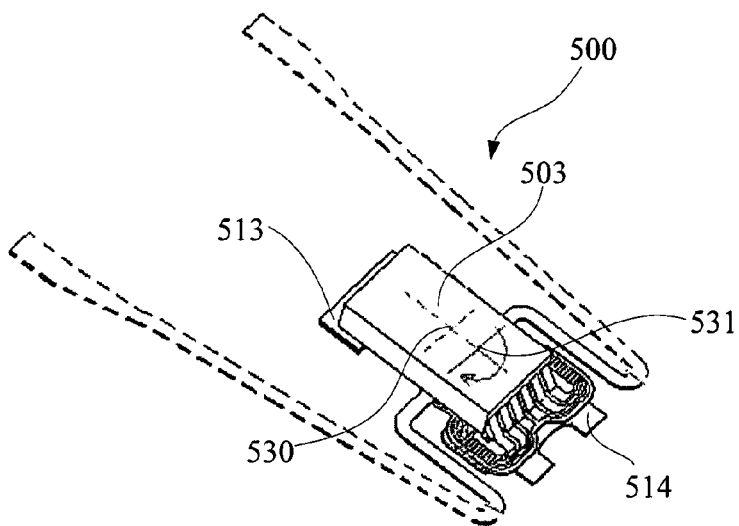
FIG. 8a partially shows a perspective view of a HGA according to another embodiment of the invention.
Figure 8B:
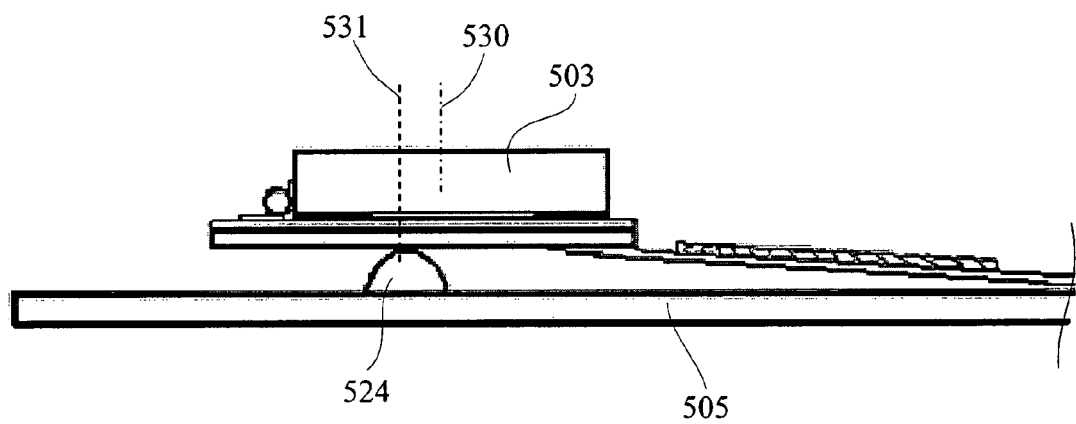

Referring to FIGS. 8a-8b, a HGA 500 according to another embodiment of the invention is shown. Similarly, a slider 503 is mounted between a suspension tongue 513 and a support plate 514. In this embodiment, the weight of the HGA 500 at leading edge portion (portion from the slider center to the leading edge) and trailing edge portion (portion from the slider center to the trailing edge) is balanced by changing location of a dimple 524 of a load beam 505. More concretely, the dimple location is shifted toward the trailing edge 534 an appropriate distance from the center of the slider 503. For example, the dimple location is shifted from original location 530 (namely, the slider center) to a new location 531 near the trailing edge 534 of the slider 503. According to lever principle, though weight of the HGA 500 at trailing edge portion is larger than that at the leading edge portion, they are still well balanced because of shorter arm of force of the trailing edge portion than the leading edge portion, thereby the two portions still being maintained in a same horizontal plane (parallel to the load beam 505) and thus achieving similar good effect as the HGA 200 described above.

The invention also provides various methods for manufacturing a HGA with balanced weight at its leading edge portion and trailing edge portion.

Figure 9:
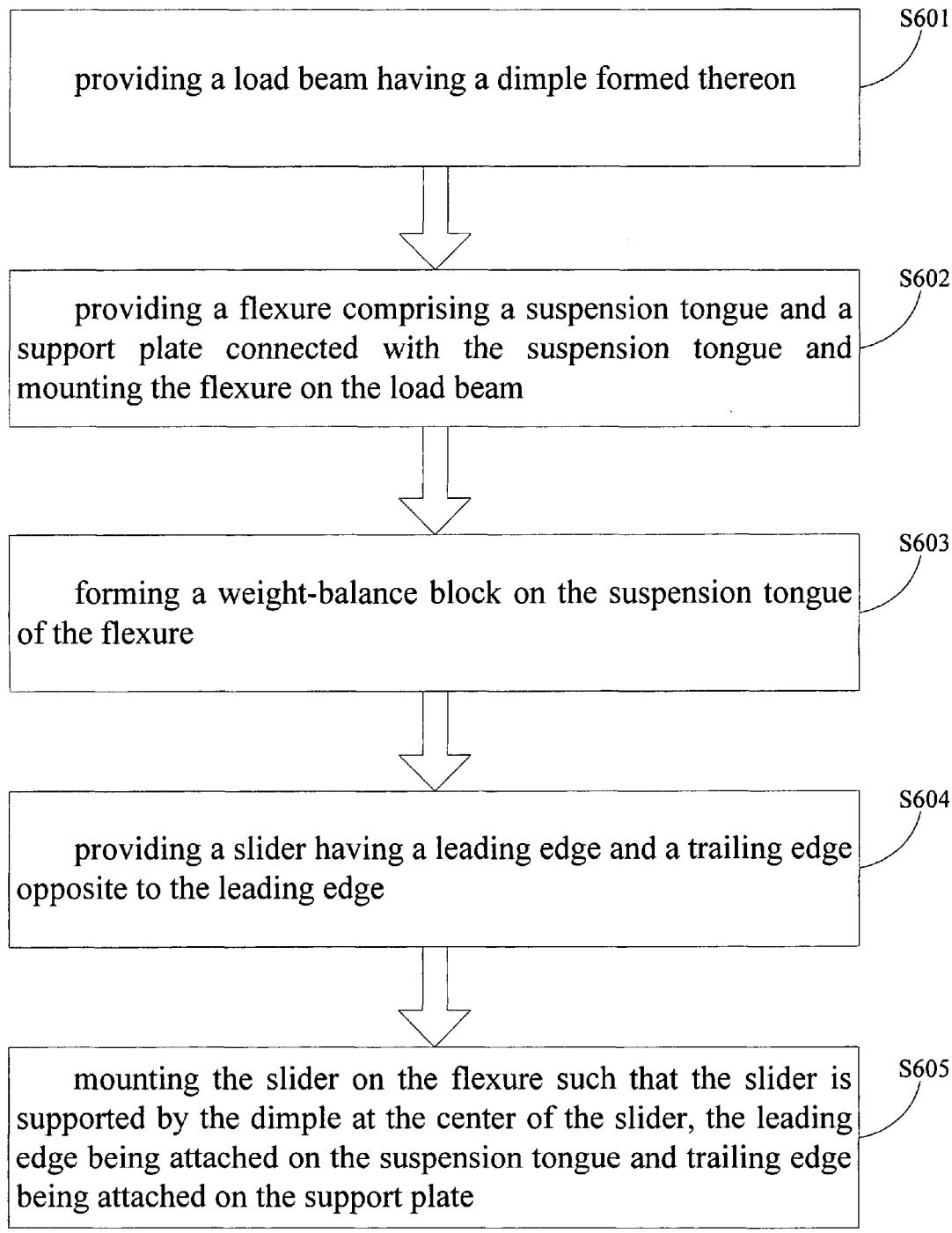
FIG. 9 shows a flowchart illustrating a method for balancing weight of a HGA between leading edge portion and trailing edge portion of a slider.

In an embodiment as shown in FIG. 9, such a method comprises the steps of: providing a load beam having a dimple formed thereon (step 601); providing a flexure comprising a suspension tongue and a support plate connected with the suspension tongue and mounting the flexure on the load beam (step 603); forming a weight-balance block on the suspension tongue of the flexure (step 604); providing a slider having a leading edge and a trailing edge opposite to the leading edge (step 604); mounting the slider on the flexure such that the slider is supported by the dimple at the center of the slider, the leading edge being attached on the suspension tongue and trailing edge being attached on the support plate (step 605).

In the embodiment, forming a weight-balance block on the suspension tongue may comprise forming a metal weight-balance block, for example forming a weight-balance block of copper material. Further, the block may be formed on the suspension tongue via any suitable method, e.g. by welding or etching away part of suspension tongue material.

According to the HGA manufacturing method described above, since a weight-balance block is properly provided on the suspension tongue, weight of the HGA at leading edge portion and trailing edge portion is sufficiently balanced.

Figure 10:
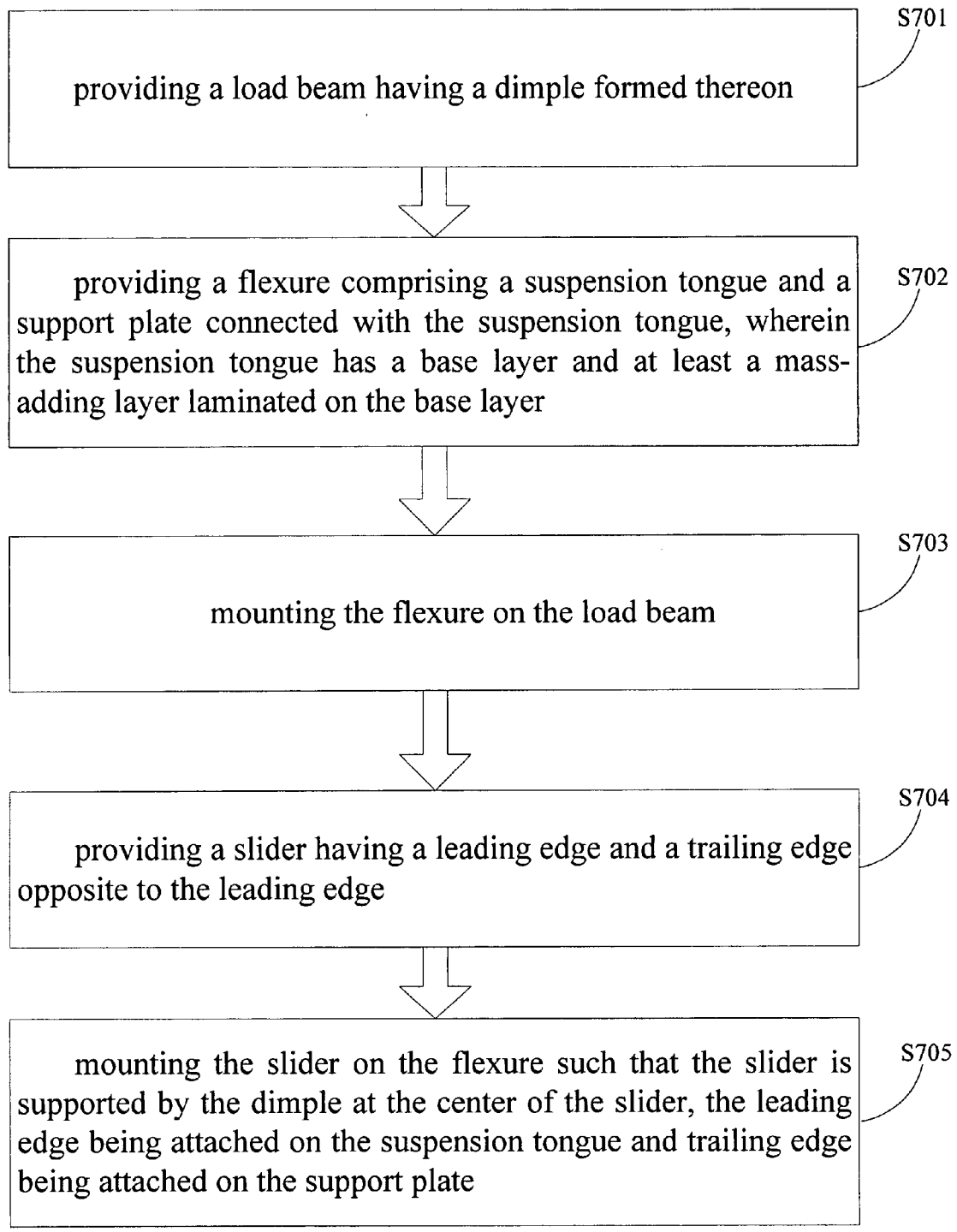
FIG. 10 shows a perspective view of a disk drive unit according to an embodiment of the invention.

In another embodiment, as shown in FIG. 10, the HGA manufacturing method may comprise the steps of: providing a load beam having a dimple formed thereon (step 701); providing a flexure comprising a suspension tongue and a support plate connected with the suspension tongue, wherein the suspension tongue has a base layer and at least a mass-adding layer laminated on the base layer (step 702); mounting the flexure on the load beam (step 703); providing a slider having a leading edge and a trailing edge opposite to the leading edge (step 704); mounting the slider on the flexure such that the slider is supported by the dimple at the center of the slider, the leading edge being attached on the suspension tongue and trailing edge being attached on the support plate (step 705). The at least mass-adding layer may be made of polymer material or metal material such as copper.

Figure 11:
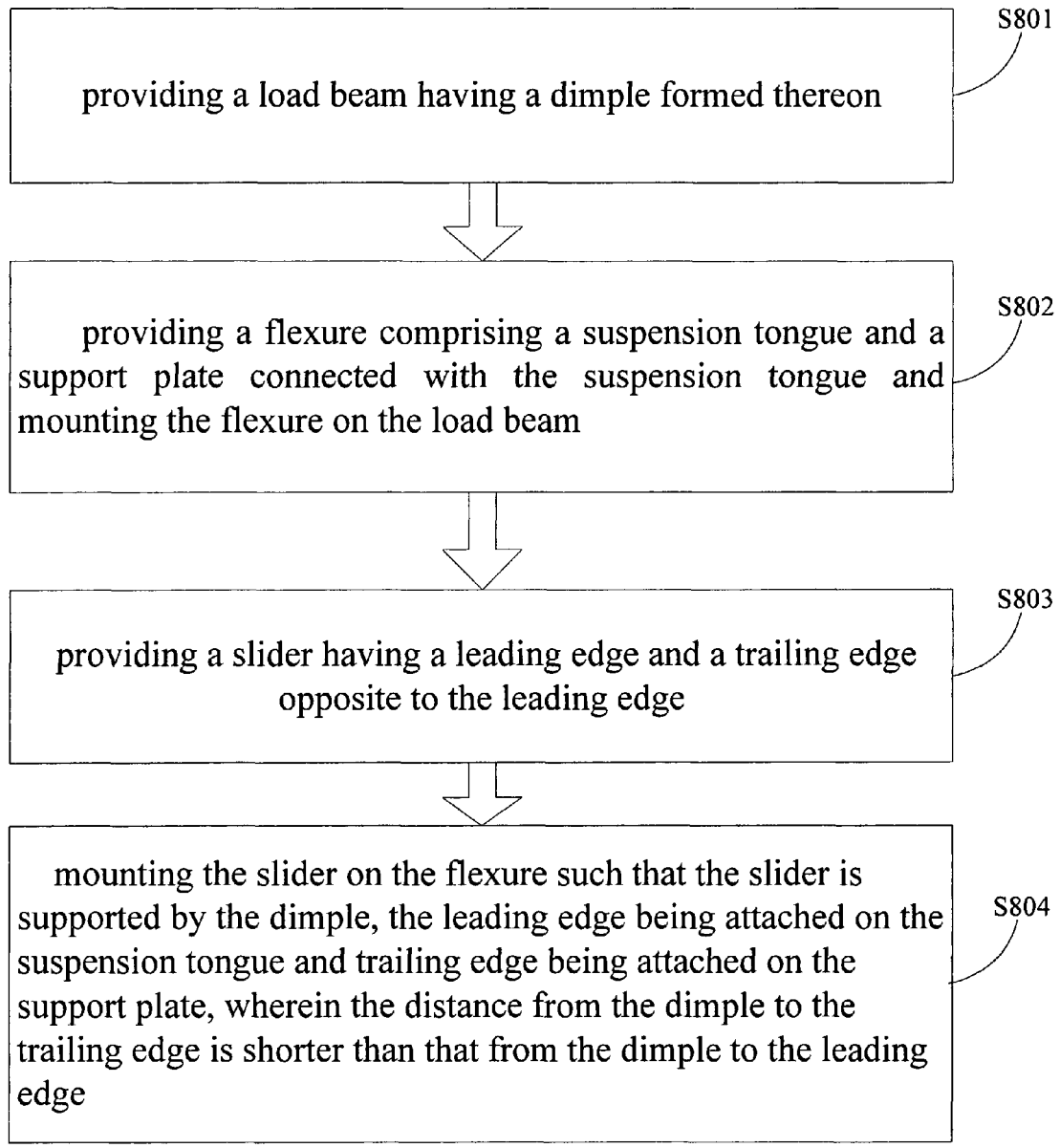
FIG. 11 shows anther method for manufacturing a HGA having balanced-weight at leading edge portion and trailing edge portion according to an embodiment of the invention.

FIG. 11 shows anther method for manufacturing a HGA having balanced-weight at leading edge portion and trailing edge portion. The method comprises the steps of: providing a load beam having a dimple formed thereon (step 801); providing a flexure comprising a suspension tongue and a support plate connected with the suspension tongue and mounting the flexure on the load beam (step 802); providing a slider having a leading edge and a trailing edge opposite to the leading edge (step 803); mounting the slider on the flexure such that such that the slider is supported by the dimple, the leading edge being attached on the suspension tongue and trailing edge being attached on the support plate, wherein the distance from the dimple to the trailing edge is shorter than that from the dimple to the leading edge (step 804).

According to other embodiments of the invention, during manufacturing a HGA having balanced weight, the suspension tongue of the flexure may be lengthened, widened or thickened so that weight of the suspension tongue may be increased, thereby leading to weight balance between two edge portions.

It should be understood that the methods described above are only illustrative, and the invention is not limited by above illustration. Various other methods are also possible for attaining the intended purposes of the invention. For instance, reducing the mass from the trailing edge can also balance the total weight between the leading edge and trailing edge of a slider, and this reduction in mass may be realized by cutting off (etching off) part material to for a hole and/or recess in the support plate adjacent the trailing edge of the slider. This will gain the same effect as the aforementioned methods.

Figure 12:
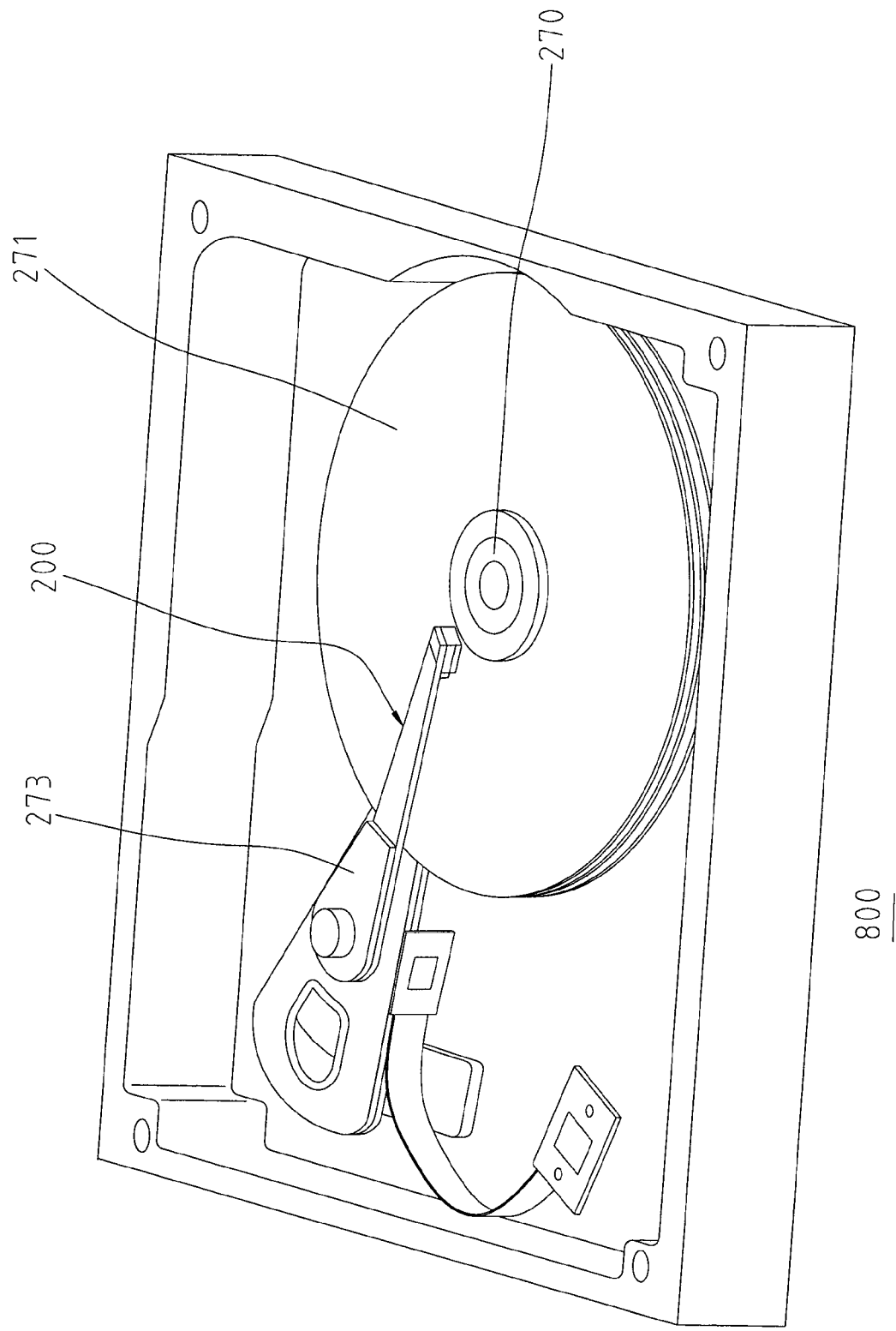
FIG. 12 shows a disk drive unit 800, which comprises a HGA, a drive arm connected to the HGA, a disk and a spindle motor to spin the disk, according to an embodiment of the invention.

FIG. 12 shows a disk drive unit 800, which comprises a HGA 200, a drive arm 273 connected to the HGA 200, a disk 271 and a spindle motor 270 to spin the disk 271. It is noted that the HGAs 300, 400 and 500 described above may also be selectively mounted therein so as to form a disk drive unit. Because the structure and/or assembly process of disk drive unit of the present invention are well known to persons ordinarily skilled in the art, a detailed description of such structure and assembly is omitted so as not to obscure the invention.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:
1. A head gimbal assembly, comprising:
a load beam having a dimple formed thereon;
a flexure comprising a suspension tongue and a support plate connected with the suspension tongue; and
a slider having a leading edge and a trailing edge opposite to the leading edge, the slider being mounted on the flexure such that the slider is supported by the dimple at the center of the slider, the leading edge being attached on the suspension tongue and the trailing edge being attached on the support plate; wherein
a weight-balance structure is formed on the suspension tongue, which is positioned remote from the dimple and located at a side of the suspension tongue corresponding to the leading edge, thereby balancing the weight of the

HGA between a portion from the trailing edge to a center of the slider and another portion from the leading edge to the center of the slider.

2. The head gimbal assembly of claim 1, wherein the weight-balance structure is made of multiple layers consisting of at least a metal layer.

3. The head gimbal assembly of claim 2, wherein the weight-balance structure is formed on the suspension tongue by welding or lamination.

4. The head gimbal assembly of claim 1, wherein the weight-balance structure is made of multiple layers consisting of at least a polymer base layer, a metal layer and a polymer cover layer.

5. The head gimbal assembly of claim 1, wherein the weight-balance structure is made of multiple layers which are laminated on the suspension tongue adjacent the leading edge of the slider.

6. The head gimbal assembly of claim 1, wherein the weight-balance structure is formed by etching away part of the suspension tongue material.

7. A head gimbal assembly, comprising:
a load beam having a dimple formed thereon;
a flexure comprising a suspension tongue and a support plate connected with the suspension tongue; and
a slider having a leading edge and a trailing edge opposite to the leading edge, the slider being mounted on the flexure such that the slider is supported by the dimple at the center of the slider, the leading edge being attached on the suspension tongue and the trailing edge being attached on the support plate; wherein
a weight-balance structure is formed on the support plate, which is positioned remote from the dimple and located at a side of the suspension tongue corresponding to the leading edge, thereby balancing the weight of the HGA between a portion from the trailing edge to a center of the slider and another portion from the leading edge to the center of the slider.

8. The head gimbal assembly of claim 7, wherein the weight-balance structure is at least a recess or hole defined on the support plate by etching means.

9. A disk drive unit, comprising:
a head gimbal assembly;
a drive arm connected to the head gimbal assembly;
a disk; and,
a spindle motor operable to spin the disk; wherein
the head gimbal assembly comprises:
a load beam having a dimple formed thereon;
a flexure comprising a suspension tongue and a support plate connected with the suspension tongue; and
a slider having a leading edge and a trailing edge opposite to the leading edge, the slider being mounted on the flexure such that the slider is supported by the dimple at the center of the slider, the leading edge being attached on the suspension tongue and the trailing edge being attached on the support plate; wherein
a weight-balance structure is formed on the suspension tongue of the flexure, which is positioned remote from the dimple and located at a side of the suspension tongue corresponding to the leading edge, thereby balancing the weight of the HGA between a portion from the trailing edge to a center of the slider and another portion from the leading edge to the center of the slider.

10. The disk drive unit of claim 9, wherein the weight-balance structure is made of multiple layers consisting of at least a metal layer.

11. The disk drive unit of claim 10, wherein the weight-balance structure is formed on the suspension tongue by welding or lamination.

12. The disk drive unit of claim 9, wherein the weight-balance structure is made of multiple layers consisting of at least a polymer base layer, a metal layer and a polymer cover layer.

13. The disk drive unit of claim 9, wherein the weight-balance structure is made of multiple layers which are laminated on the suspension tongue adjacent the leading edge of the slider.

14. The disk drive unit of claim 9, wherein the weight-balance structure is formed by etching away part of the suspension tongue material.

* * * * *